United States Patent
Adams et al.

(10) Patent No.: US 10,820,064 B2
(45) Date of Patent: Oct. 27, 2020

(54) MARKING VIDEO MEDIA CONTENT

(71) Applicant: Friend for Media Limited, Birmingham (GB)

(72) Inventors: Richard William Adams, Birmingham (GB); Raissel Ramirez Orozco, Birmingham (GB); Jonathan Norman Friend, Birmingham (GB); William Del Strother, Birmingham (GB)

(73) Assignee: Friend for Media Limited, Birmingham (GB)

( * ) Notice: Subject to any disclaimer, the term of this patent is extended or adjusted under 35 U.S.C. 154(b) by 23 days.

(21) Appl. No.: 15/938,470

(22) Filed: Mar. 28, 2018

(65) Prior Publication Data

US 2018/0288497 A1    Oct. 4, 2018

(30) Foreign Application Priority Data

Mar. 28, 2017   (GB) .................................. 1704955.2

(51) Int. Cl.
*G06K 9/00* (2006.01)
*H04N 21/8358* (2011.01)
(Continued)

(52) U.S. Cl.
CPC ......... *H04N 21/8358* (2013.01); *G06F 21/16* (2013.01); *G06T 1/0021* (2013.01); *G06T 7/10* (2017.01)

(58) Field of Classification Search
CPC .................................................. G06T 1/0085
See application file for complete search history.

(56) References Cited

U.S. PATENT DOCUMENTS 6,411,725 B1 *   6/2002   Rhoads .................. G06F 21/10
                                                          382/100
2005/0105763 A1    5/2005   Lee et al.
(Continued)

FOREIGN PATENT DOCUMENTS

GB         2534752 A        8/2016
WO      2015067964 A2       5/2015
WO      2015185944 A1      12/2015

OTHER PUBLICATIONS

Extended European Search Report issued by the European Patent Office in relation to European Application No. 18164660.5 dated Aug. 2, 2018.
(Continued)

*Primary Examiner* — Oneal R Mistry
(74) *Attorney, Agent, or Firm* — Carter, DeLuca & Farrell LLP; George Likourezos (57) ABSTRACT

A method for marking video media-content, comprising a plurality of frames, with a user ID. The method includes arranging a media-delivery platform to have a plurality of target devices connected thereto and further arranging the media-delivery platform to deliver the video media-content to a specified target device of the target devices, at which the user ID is being used. An image is overlaid over at least some frames of the plurality of frames as the video media-content is displayed at the specified target device. The image encodes the User ID and comprises a plurality of zones, the zones being arranged to encode the User ID. A visual property of the image is arranged to vary within at least some of the zones, and the image is arranged such that when the image is overlaid on the video media content, the image is at least substantially imperceptible to a user.

18 Claims, 7 Drawing Sheets

(51) Int. Cl.
*G06T 1/00* (2006.01)
*G06T 7/10* (2017.01)
*G06F 21/16* (2013.01)

(56) References Cited

U.S. PATENT DOCUMENTS

| | | | |
|---|---|---|---|
| 2005/0135856 A1* | 6/2005 | Uchida | G06T 1/005 399/411 |
| 2005/0193205 A1 | 9/2005 | Jacobs et al. | |
| 2007/0019836 A1* | 1/2007 | Thorwirth | G06T 1/0028 382/100 |
| 2012/0163653 A1 | 6/2012 | Anan et al. | |
| 2013/0170695 A1 | 7/2013 | Anan et al. | |
| 2016/0328398 A1 | 11/2016 | Adams et al. | |
| 2018/0014089 A1* | 1/2018 | Hazan | G06F 21/16 |

OTHER PUBLICATIONS

Combined Search and Examination Report issued by the United Kingdom Intellectual Property Office in relation to UK Application No. GB1805002.1 dated Jul. 12, 2018.

\* cited by examiner

MARKING VIDEO MEDIA CONTENT

CROSS-REFERENCE TO RELATED APPLICATION

This application claims the priority benefit of United Kingdom Patent Application No. 1704955.2, filed on Mar. 28, 2017, which is hereby incorporated by reference herein in its entirety.

BACKGROUND

This invention relates to systems and methods for the marking of video-media content with a user ID. In particular, embodiments relate to providing an overlay for video-media content, which might be streamed or broadcast video.

The advent of computer networks, such as the Internet and the World Wide Web (WWW) has meant that computing devices are becoming massively interconnected, facilitating the copying and redistribution of media content on an unprecedented scale. Media content is valuable and techniques are known for trying to protect media content. Such techniques include the watermarking of media content so that it has a specific signature or marking, which may be imperceptible to a viewer, and also the fingerprinting of content (for example, as described in the UK Patent Application with publication number GB2534752) in order to capture characteristics of the content without actually imposing a characteristic onto the content.

As the bandwidth available on computer networks has increased, the nature of the content held and viewed on those networks has changed from text based information to the present day where it is now common to have video based data, which can be of high resolution such as 4K, or the like. Nonetheless, whatever the type of content there is an ongoing desire to identify illicit copies of the content, generate usage data for the content, provide mechanisms to deliver content to users and the like. Given the massive amounts of data available on networks such as the Internet and WWW, the monitoring of the usage of the data on those networks has become difficult, and is now virtually impossible to perform manually.

Moreover, as networks are used as the delivery mechanism for media content of events such as sporting events, movies, and the like, a significant amount of content, often video content, can be delivered. As such, it is a problem to find techniques that are fast enough to process the significant amounts of information. In addition, the marking is advantageously designed not to degrade legitimate users' viewing experiences. At the same time, marking that can be easily spotted and removed by "pirates" may be of limited use, so it is a problem to find techniques that produce marking which is not easy to get rid of and yet which is imperceptible.

SUMMARY

According to a first aspect of the invention, there is provided a method of marking video media-content which comprises a plurality of frames with a user ID. The method may comprise arranging a media-delivery platform to have a plurality of target devices connected thereto. The media-delivery platform may be arranged to deliver the video media-content to a specified target device of the target devices, at which the user ID is being used. The method may overlay an image over at least some frames of the plurality of frames. Typically, the overlaying is performed as the video media-content is displayed at the specified target device. The image may comprise a plurality of zones, wherein the zones are typically selected to encode the User ID (e.g. by their position and/or shape). A visual property of the image may be arranged to vary within at least some of the zones. The image is typically arranged such that when the image is overlaid on the video media content, the image is at least substantially imperceptible to a user.

Embodiments performing such a method may advantageously allow identification of users and/or devices to which the media content was sent.

Optionally, the variation of the visual property comprises a texture across the at least some of the zones.

The lengthscale of the variation of the visual property may be small compared to the size of each zone.

The variation may be noise-like.

The amplitude of the variation may be within pre-determined upper and lower bounds.

The visual property may be or comprise transparency.

The visual property may be or comprise intensity.

Optionally, the image is formed by combining a signal with an overlay pattern. The signal may provide the variation of the visual property and the overlay pattern may provide the zones.

The signal may be a random or pseudo-random noise-like signal.

The signal may be arranged to cover at least an overlay region of a frame. Typically, the overlay region has a smaller area than the frame.

The overlay pattern may comprise a segmentation of the overlay region into the plurality of segments. Further an operation may be associated with each segment in order to generate the overlay pattern.

The image may be formed by processing the signal according to the overlay pattern. The processing may comprise applying the operation associated with each segment to the portion of the signal falling within that segment so as to form the plurality of zones.

The signal may be overlaid over the entirety of each frame of the at least some frames, but may only be processed according to the overlay pattern in the overlay region.

The operation may be or comprise multiplication. Each segment may have a scaling factor associated therewith. Two different operations may be used, for example comprising scaling factors of −1 and 1, respectively.

The same signal and the same segmentation may be used for multiple target devices each associated with a different user ID. The different user ID may provide differentiation as to which operation is associated with which segment in the overlay pattern, so changing the positions of the zones in the image according to the user ID.

The image may be arranged to cover at least 20% of each frame to which it is applied.

The transparency of the image may be selected to render the image substantially imperceptible on each frame to which it is applied. Conveniently, the transparency is at least 0.90 (90%). However, the transparency may be higher and may for instance be 97%, or in other embodiments the transparency may be in the range 99% to 99.5%.

The image may be arranged to use redundant coding such that errors can be corrected. The method may optionally use correction schemes such as a Hamming code, Golay Error Correction codes, Reed-Solomon codes, Reed-Muller codes, or the like.

The image may be generated once and then stored at the target device. In this way, the same image can be overlaid over multiple frames without needing to be re-generated and such embodiments may require a lower processing power on the target device.

The image may be rendered in a semi-transparent layer on the target device. The semi-transparent layer may be arranged to be aligned with the frames of the video media content.

According to a second aspect of the invention, there is provided a method of securing and/or tracing video media-content which video-media content comprises a plurality of frames. The method may comprise arranging a media-delivery platform to have a plurality of target devices connected thereto. The media-delivery platform may be arranged to deliver the video media-content to a specified target device of the target devices, at which the user ID is being used. The target device may be arranged to overlay an image over at least some frames of the plurality of frames as the video media-content is displayed at the target device. Conveniently, the method is arranged to monitoring for candidate video media-content; Conveniently, the method is further arranged to extract the overlay pattern from frames within the or each candidate video media-content to identify the user ID being used at the target device to which the video media-content was delivered.

Conveniently, the image comprises a plurality of zones. In one embodiment, the zones are selected to encode the User ID. A visual property of the image may be arranged to vary within at least some of the zones. The image is typically arranged such that when the image is overlaid on the video media content, the image is at least substantially imperceptible to a user.

According to a third aspect of the invention, there is provided a method of marking video media-content which comprises a plurality of frames with a user ID. The method may comprise, at a target device associated with the user ID, receiving the video media-content; The method may be arranged to overlay an image over at least some frames of the plurality of frames as the video media-content is displayed at the specified target device.

The image typically comprises a plurality of zones, and the zones may be selected to encode the User ID. A visual property of the image may be arranged to vary within at least some of the zones. The image is arranged such that when the image is overlaid on the video media content, the image is at least substantially imperceptible to a user.

According to a fourth aspect of the invention, there is provided a machine readable medium containing instructions which when read by a machine, cause a processor of that machine to receive, at a target device associated with a user ID, video media-content which comprises a plurality of frames. The instructions may further cause the target device, associated with the user Id, to overlay an image over at least some frames of the plurality of frames as the video media-content is displayed at the specified target device The image may comprise a plurality of zones, and the zones may be selected to encode the User ID. A visual property of the image may be arranged to vary within at least some of the zones. The image may be arranged such that when the image is overlaid on the video media content, the image is at least substantially imperceptible to a user.

According to a fifth aspect of the invention, there is provided a target device associated with a user ID and arranged to mark video media-content which comprises a plurality of frames such that the user ID is encoded in the marked video-media content. The target device may be arranged to receive the video media-content. The target device may be arranged to overlay an image over at least some frames of the plurality of frames as the video media-content is displayed at the specified target device.

The image may comprise a plurality of zones, the position and/or shape of the zones may be selected to encode the User ID. A visual property of the image is arranged to vary within at least some of the zones. The image is arranged such that when the image is overlaid on the video media content, the image is at least substantially imperceptible to a user.

The skilled person will appreciate that a feature of any one aspect of the invention may be applied, mutatis mutandis, to any other aspect of the invention.

Further the skilled person will appreciate that elements of the aspects may be provided in software. However, the skilled also appreciate that any software element may be provided in firmware and/or within hardware, or vice versa.

The machine readable medium referred to in any of the above aspects of the invention may be any of the following: a CDROM; a DVD ROM/RAM (including −R/−RW or +R/+RW); a hard drive; a memory (including a USB drive; an SD card; a compact flash card or the like); a transmitted signal (including an Internet download, ftp file transfer of the like); a wire; etc.

The skilled person will appreciate that embodiments of the invention may offer one or more of the following advantages, as compared to prior art systems:
 (i) lower impact on the viewer experience due to the transparency of the overlay;
 (ii) increased resistance to removal of marking, as compared to logos in a corner of a screen or other marks which cover only a small area of the screen for example;
 (iii) lower computational requirement on the user device (i.e., a target device):
  a. the processing to be performed is relatively lightweight and no access to the underlying video data stream is required; and
  b. the processed signal can be stored, for example as an image file, and applied and re-applied when wanted without further calculations;
 (iv) increased ease of detection of marking as the overlay can be present over a large portion, or all, of the frame and/or for prolonged periods (i.e. over many frames) and at multiple times during video content without detracting from the user experience, so avoiding the need to identify specific times or positions within video media when looking for a known kind of marking.

BRIEF DESCRIPTION OF THE DRAWINGS

There now follows, by way of example only, a detailed description of embodiments of the invention with reference to the accompanying drawings of which.

DETAILED DESCRIPTION

The following description provides a description of various embodiments and the skilled person will readily appreciate that a feature described in relation to a given embodiment may be applied, mutatis mutandis, to any of the other embodiments.

Further, it is convenient to describe the system in relation to the monitoring of video streams as the mechanism to deliver media content to a user. However, in other embodiments, the techniques described may be equally applied to other forms of media content. For example, video files such as MP4 files and the like may be thought of as being media content. Thus, reference to a stream in the text below should not be taken as limited to the streaming of media and is also intended to refer to non-streamed delivery mechanisms, including broadcast. It will be appreciated that in other embodiments, a user may request media content other than a media stream. For example, a user could download a file providing media content (e.g., a video file or an audio file).

Figure 8:
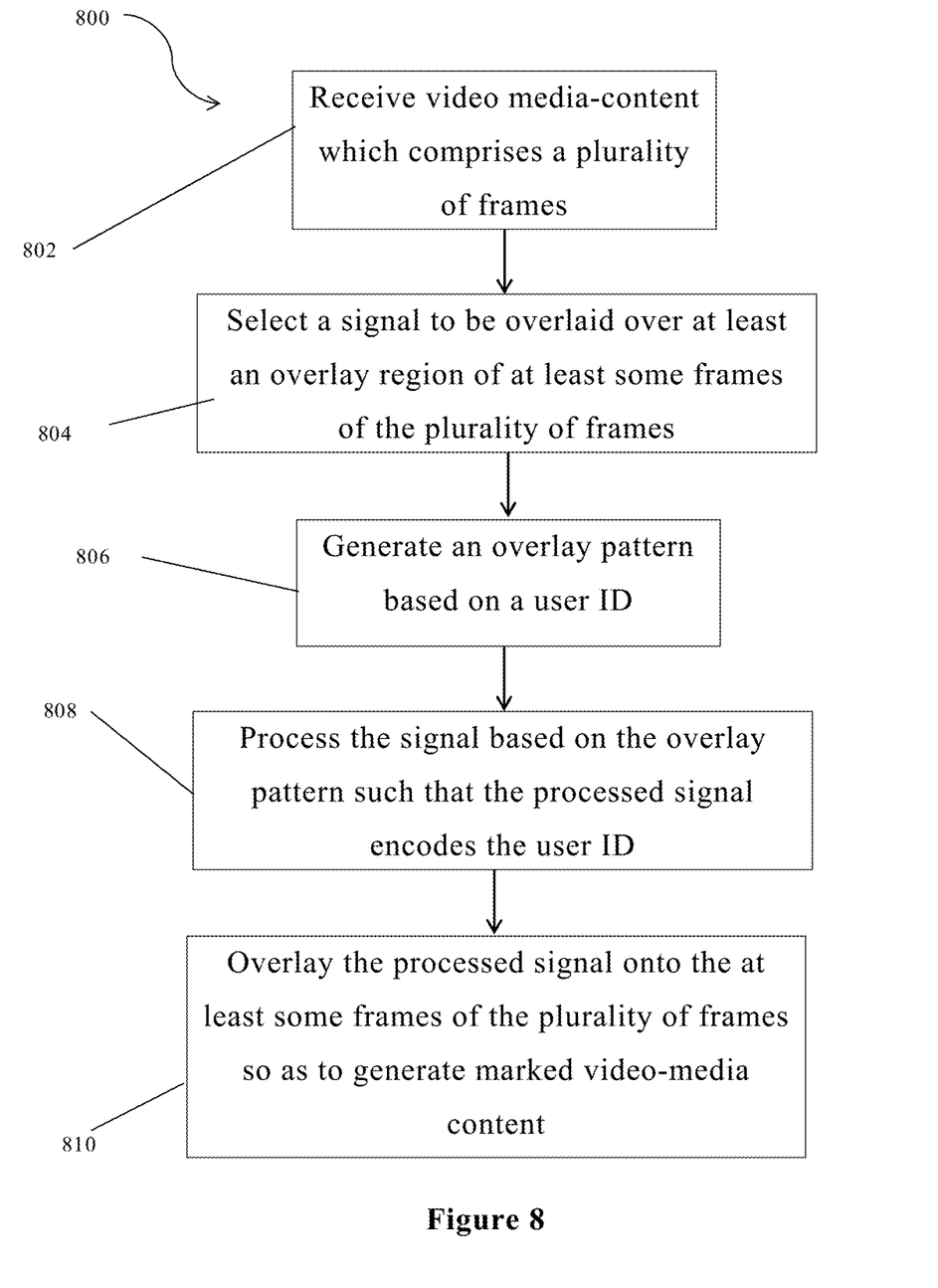
FIG. 8 shows a flow chart of the marking of video media by embodiments.

Reference is made throughout the following description to FIG. 8 which illustrates the overall process 800 that is employed, by embodiments, to mark video media content 104.

Figure 1:
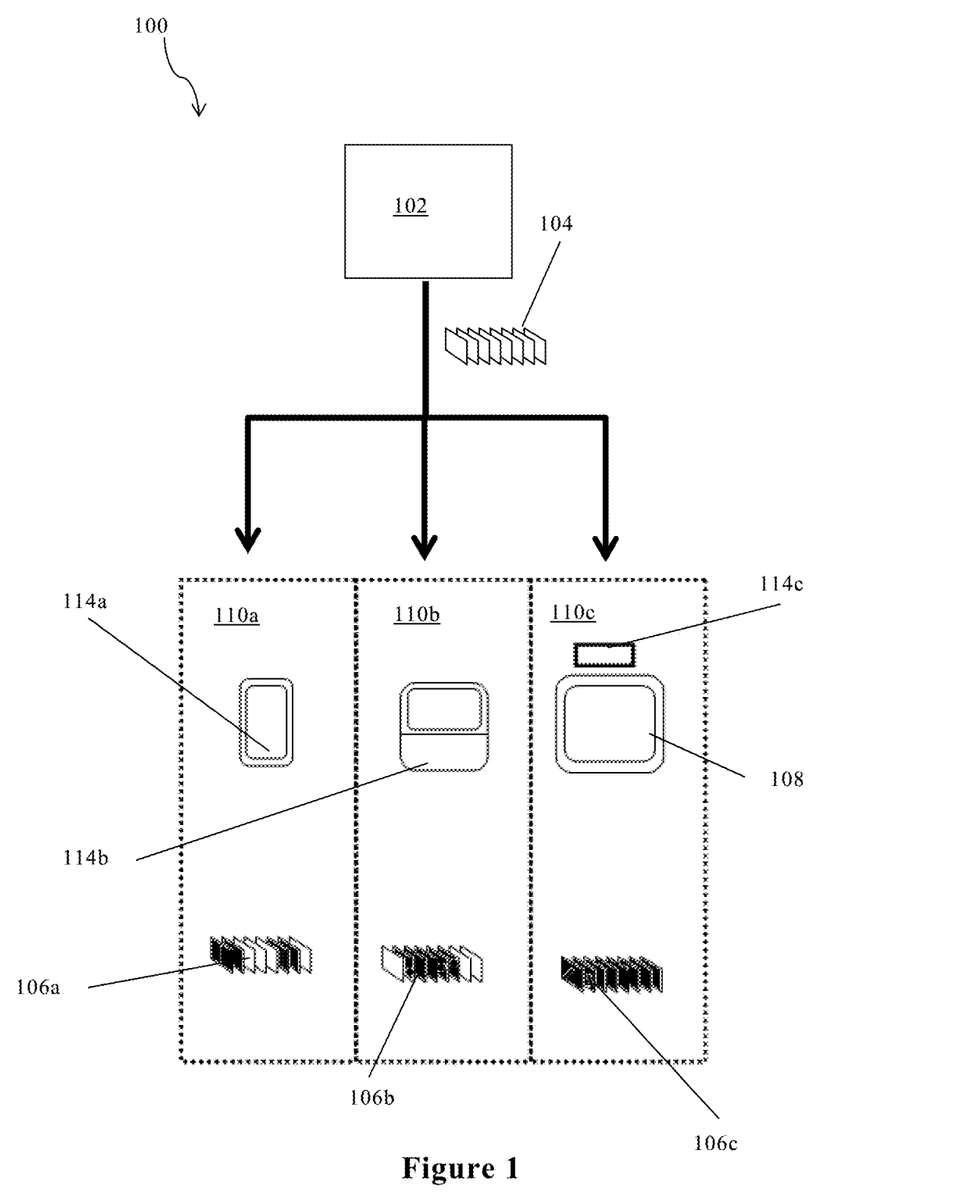
FIG. 1 schematically shows a system arranged to deliver media streams to user devices (i.e., target devices)

The system 100 shown in FIG. 1 may be thought of as a media delivery platform.

The system 100 comprises a content distributor 102. In the embodiment being described, the content distributor 102 stores films and other non-live media in addition to offering live media.

The content distributor 102 distributes video media content 104 to users. The distribution may be on demand and/or according to a schedule. Each user has a unique user ID and receives the video media content 104 at a target device 114. The user ID is associated with the or each target device 114 used by the corresponding user.

Each target device 114a-c may be thought of as being a target device to which media content can be delivered. Specifically, a user, using a target device 114a-c, requests a media stream (i.e., video media content) from the system 100, and receives a broadcast stream or the like.

The target device 114 may be a smartphone 114a, a lap-top 114b or other computer, a set-top box 114c with a display screen 108 connectable thereto, a television or the like.

Three such target devices 114 are shown in FIG. 1: a mobile telephone/tablet 114a (such as an iPhone™; an Android Device™; a Windows™ mobile; or a Blackberry™ or an iPad™; a Kindle™; an Android Tablet™ or the like); a computer 114b (such as a PC running Windows™, LINUX or the like; an Apple computer; or the like) and a set top box 114c with associated television 108. The skilled person will appreciate that the set top box functionality may be implemented within a television 108 instead of as a separate device. The skilled person will also appreciate that other devices such as smart watches or the like may also provide target devices 114.

The skilled person will understand that, if the target device 114 is the property of a given user, identifying the target device 114 may identify the user. A device ID is equivalent to a user ID in such cases. Alternatively or additionally, a user may log in to a media service from any target device 114 to access media content. In such embodiments, identifying the target device 114 may not identify the user, as many users may use the same device. It is therefore advantageous, in many embodiments, to generate the unique version based on user information (such as a user ID, or the like) in preference to device information.

Figure 11:
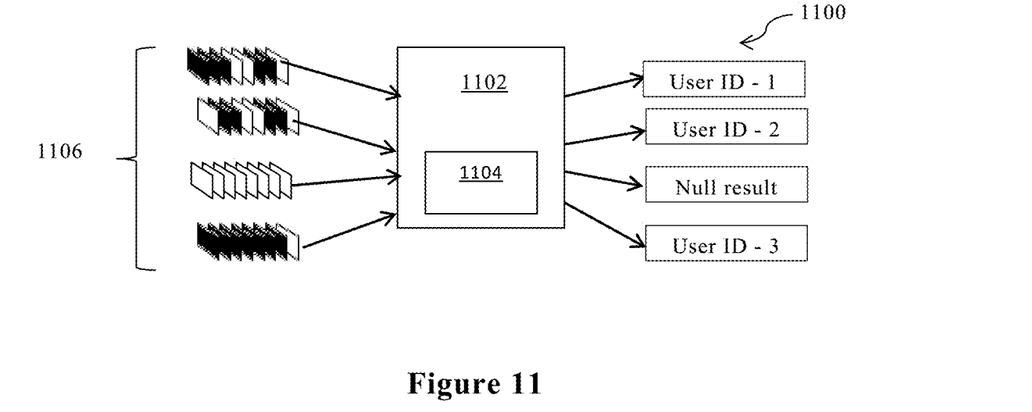
FIG. 11 schematically shows a monitoring system arranged to identify the images discussed herein.

The system 100 may allow the media stream 104 (i.e., video media content) to be fingerprinted. The UK Patent Application with publication number GB2534752 describes the Fingerprinting in more detail and the skilled person is directed to read the contents of this earlier application in relation to the fingerprinting and the content of that earlier application is incorporated by reference. Fingerprinting of the media stream 104 may be used to assist a monitoring system 1100 in detecting and extracting identifiers from marked video content 106a-c, as is described in more detail below.

Further, the system 100 allows the media stream 104 to be delivered to a plurality of users and marked 810 according to the corresponding user ID. Thus, the system may be thought of as delivering the media stream (i.e., media content) to a user ID.

Advantageously, the media stream 104 is marked such that the marked version 106a-c of the media stream 104 reproduced for the user is a unique version of the media stream 104, encoding that user's user ID.

In the embodiment being described, the target devices 114a-c typically each receive the same delivered media stream 104; e.g., a broadcast media stream, or a streamed media stream. A process running within the target device 114a-c is then arranged to add a unique identifier 500a-c such that when the media stream is displayed on that target device 114a-b or an associated device 108, a marked stream 106a-c is presented.

The media stream 104 is marked by the application of an overlay 500a-c, as described in more detail below. The overlay 500a-c is an image arranged to be overlaid on frames of the video media content. The image 500a-c is arranged to be at least substantially imperceptible to a user. The imperceptibility is achieved by a combination of a high transparency (i.e. low opacity) of the image, and a variation in a visual property of the image which assists in disguising the image. In the embodiments being described, the visual property which is varied is intensity (luma value) and also the chroma intensity. In additional or alternative embodiments, the visual property may be or comprise transparency. However, embodiments may be arranged to vary at least one, but may be more of: intensity (luma), chroma (colour) and transparency.

In this way, even if the video media content is paused on a specific frame 302 which is marked with an overlay 500a-c, a user is not able to see the overlaid image 500a-c. Typically, even if the frame 302 is a single, solid colour and intensity (so making any variation due to an overlay easier to spot than on busier content), the variation in the overlaid image 500*a-c* may give the impression of a small amount of noise in the content as opposed to a separate overlaid image 500*a-c*.

In embodiments with zones of the image 500*a-c* in which the transparency of the image 500*a-c* is 100% or intensity of the image is 0%, variation may not be used to disguise the image.

The skilled person will appreciate that the examples shown in the Figures are schematic examples generated to illustrate the principles of the invention—the images shown are necessarily clearly visible to fulfil this purpose, and so would be unlikely be suitable without adjustment of the intensity and/or transparency.

The overlay 500*a-c* encodes the user ID, so allowing a user to be uniquely identified, and may be referred to as a unique identifier. The unique identifier allows the user to whom a given version 106*a-c* of the media stream 104 was presented to be identified as described below. Thus, it becomes possible to trace the source of illicit copies of media-content by decoding the user ID from that illicit copy.

In the embodiment being described, the overlay 500*a-c* has a relatively high transparency, such that it is visually imperceptible when overlaid on video media content 104. The transparency may both minimise any distortion of the user's viewing experience and make detecting the overlay 500*a-c* harder for third parties. The transparency is at least 0.90 (90%), and may be around 0.99 (99%). Indeed, the embodiment being described, the transparency is substantially 99.5%.

In the embodiments being described, a separate monitoring system 1100 is used to monitor content to look for the unique identifiers 500*a-c*.

In alternative or additional embodiments, the same system 100 may allow media content to be monitored to look for illicit copies.

A network, such as the Internet and/or the World Wide Web, may be monitored for copies, or other illicit versions (hereinafter referred to as 'copies'), of the media stream 104, by analysing candidate media streams 906 to see if the unique identifiers 500*a-c* are present. Should copies be detected then the monitoring system may be arranged to determine, using the unique identifiers 500*a-c*, the user ID encoded therein so as to identify the user responsible for the copy. "Pirated" DVDs and the likes may also be checked using this technique.

Additionally, the monitoring system 1100 may determine the identity of the user having the user ID identified by the unique identifier 500*a-c* within the marked stream 106*a-c*. For example, the user is likely to have an account with the provider of the media that they are receiving (i.e., the broadcaster of the media stream 104) and the identity of the user may be obtained from the account details of that user. In other embodiments, users may need to input an identifier, etc., for example by logging in, as they request the media stream. For example, in a broadcast system 100 (such as a subscription satellite service), the identity of a user is given by a decoder card (or similar mechanism) which is inserted into the set top box 1114*c*. In systems which rely on the Internet (or other network) as a delivery mechanism, often call Over The Top (OTT) systems, the identity of a user is typically given by the login details used to access the media-content.

A monitoring system suitable for being adapted for use with the present invention is further described in the PCT application with publication number WO/2015/067964. The skilled person is directed to read that Application to obtain details of the monitoring system and the content of that earlier application is incorporated by reference.

Figure 10:
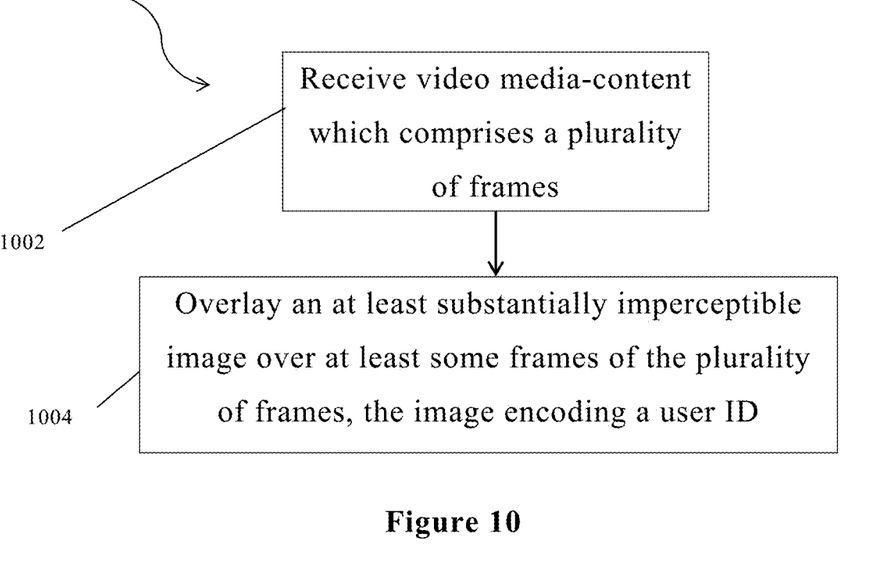
FIG. 10 shows a flow chart of the marking of video media in accordance with the invention.

The media stream 104 passes through a marking process 800, 1000 which is dependent on the user ID of the user for whom the content 104 is delivered.

In the embodiment being described, the image forming the unique identifier 500*a-c* is applied to a subset of the frames 302 of the video media content 104, so producing a marked stream 106*a*, 106*b* in which some of the frames do not contain the image.

In some embodiments, every frame 302 within the marked streams 106*c* might be marked. In some embodiments, one or more blocks of sequential frames 302 might be marked. In other embodiments, every Nth frame 302 may be marked (where N might be an absolute number or a function), for example marking alternate frames.

The marking processes 110*a*, 110*b*, 110*c* therefore each display distinct versions 106*a*, 106*b*, 106*c* of the media stream 104 when displayed on the target device 114*a*, 114*b*, 108, as a different overlay 500*a-c* is overlaid based on the different user ID. Thus, should the media content that is being displayed on a target device 114*a*, 114*b*, 108 be copied, distinct versions 106*a-c* are generated, which may be termed marked media streams 106*a-c*.

The user ID can be obtained from the marked media streams 106*a-c*, for example by averaging frames together such that the video media content 104 averages out, leaving the variations caused by the overlay 500*a-c*, which has the same pattern for all frames 302 of the marked media stream 106*a-c* to which the overlay 500*a-c* is applied. One or more filters may also be used. Thus, averaging a plurality of frames provides a mechanism to recover the encoded User ID.

The skilled person will understand that the overlay 500*a-c* can therefore be used to identify the user, in an automated way.

The skilled person would understand that the marking process 800, 1000 may be performed by the target device 114, 108 which displays the media content (for example, a television, a set top box, computer, mobile phone or the like) or by an associated device 114*c* (for example, a set-top box, encoding module or the like) that processes the media content 104 to generate a display.

In the case of the television 108 and set top box 114*c* combination, the unique identifier 500*a-c* is added to the delivered media stream 104 by the set-top box 114*c*. Often the set-top box 114*c* does not have access to the delivered media stream 104, which is delivered via a secure channel. However, in such embodiments, the set-top box 114*c* can still overlay, or otherwise superimpose, content (including the unique identifiers 500*a-c* described herein) on top of the delivered media stream 104 such that when the television 108 displays the delivered media content 104, it is actually the marked stream 106*c* that is being displayed (i.e., a combination of the delivered media stream 104 and the overlay 500*a-c*). As the unique identifier 500*a-c* is an image, modifying visual properties of the content when displayed, no transformation to or from the frequency domain is required. Access to, or processing of, the underlying video stream 104 is therefore not required.

In a similar manner, an application (App) running on a smart phone 114*a* may not have access to underlying stream of media content that is arranged to display. Here access is intended to mean the ability to manipulate or process, and the application may simply be able to display the underlying media content. However, the application can be arranged to overlay another layer on-top of an underlying media stream.

In one embodiment, an application is downloaded to the set-top box 114c and it is that application that adds the unique identifier 500a-c to the delivered media stream 104. As is known in the art of set top boxes, the application can be triggered by various mechanisms such as when a user changes channel or the like. Once generated, the unique identifier 500a-c can be saved for re-use. The unique identifier 500a-c can be saved, for example, in a standard image file format such as a Portable Network Graphics (PNG) or Graphics Interchange Format (GIF) file, or can be saved in raw binary format or the likes.

Other devices such as the telephone 114a, or computer 114b, may have similar mechanisms to the set-top box 114c in which the unique identifier 500a-c is superimposed onto the delivered media stream 104, without requiring modification or processing of the video stream 104 itself.

Should a party copy content being displayed by the television 108, they will typically either copy the output of the set-top box 114c or record the screen of the television 108, smartphone, computer, etc. Each of the mechanisms of copying the content will result in the marked stream 106c being recorded with the unique identifier 500a-c present therein.

Methods of generating an image 500a-c to serve as a unique identifier according to various embodiments are now described in more detail.

In the method 1000 shown in FIG. 10, video media content is received (step 1002) and an image 500a-c is then overlaid (step 1004) on at least some frames of the video media content. The image 500a-c has a plurality of different zones 502a-c, 504a-c which are used to encode the user ID. A visual property of the image 500a-c is different for different zones 502a-c, 504a-c, so allowing the zones to be distinguished from each other. The difference is imperceptible to a user, but can be extracted computationally, such as averaging over a number of frames described elsewhere herein.

The texture (i.e. visual property variation) and transparency of the image 500a-c are selected to make the image 500a-c imperceptible to a human viewer. The transparency is high such that the video media content underneath can be seen. The texture may reduce or avoids the presence of sharp lines in the image 500a-c, which could allow a viewer to discern the presence of an overlaid image 500a—.

Figure 9A:
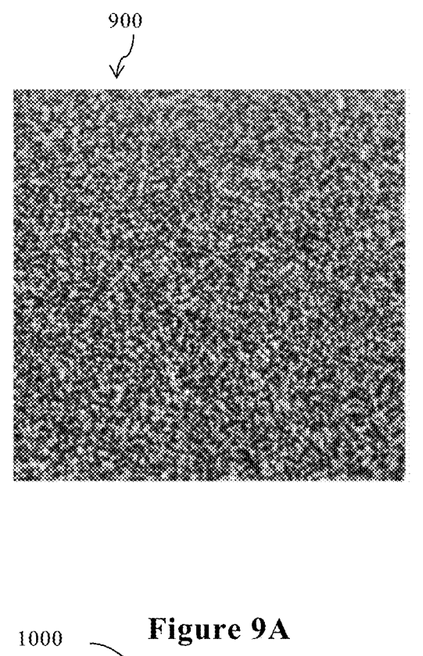
FIG. 9a shows a schematic view of a different signal suitable for use with the invention.
Figure 9B:
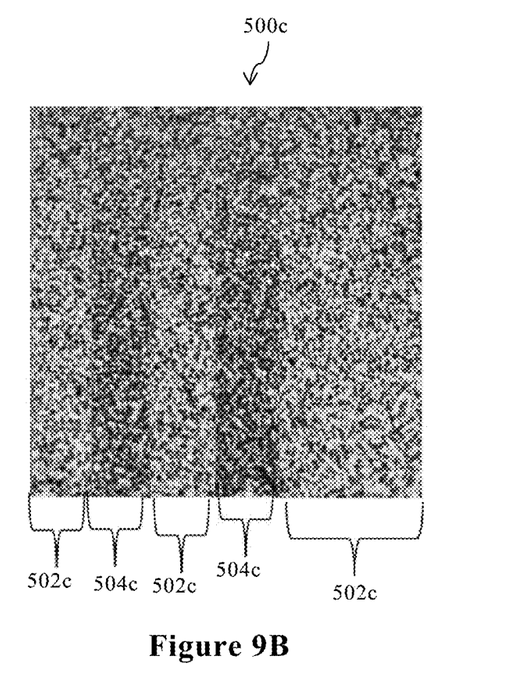
FIG. 9b shows the image generated by processing the signal shown in FIG. 9a using the overlay pattern of FIG. 4b.

Conveniently, the visual property varies on a lengthscale which is small relative to the frame 302, as shown in FIGS. 9A and 9B. Also conveniently, the visual property varies on a lengthscale which is also small relative to each zone, as shown in FIGS. 9A and 9B. An advantage of embodiments having such a visual property variation on a relatively short lengthscale is that they may tend to make the variation resemble random noise in the underlying video media content.

The method 800 described by FIG. 8 illustrates a particular way in which the image 500a-c may be generated, in accordance with some embodiments of the invention.

In the embodiment shown in FIG. 8, an overlay pattern 400a-d which unambiguously represents the user ID is generated, and then one or more operations are applied to combine the overlay pattern 400a-d with a selected signal 200, 900 and to render the resultant overlay 500a-c at least substantially imperceptible to the human visual system.

First, a signal 200, 900 is selected. The signal 200, 900 is suitable for being overlaid across at least an overlay region 310a, 310b of frames 302 of the video media content 104.

In the embodiments being described, the overlay region 310a,b,c covers between 20% and 100% of the frame area 302. In embodiments in which the overlay region 310a,c does not cover the entire frame area, the overlay region 310a,c is at least mainly provided away from the edges of the frame area 302 to reduce the effect of cropping of frames on the unique identifier 500a,b,c. The overlay region 310a is provided centrally with respect to the frame 302 in the embodiments shown in FIGS. 3a and 6b.

In the embodiments being described, the signal 200, 900 is an at least quasi-three-dimensional (quasi-3D) signal, having an amplitude/value at each point in the overlay region 310a, 310b. The amplitude/value is used to determine a property of the image 500a-c.

Figure 2:
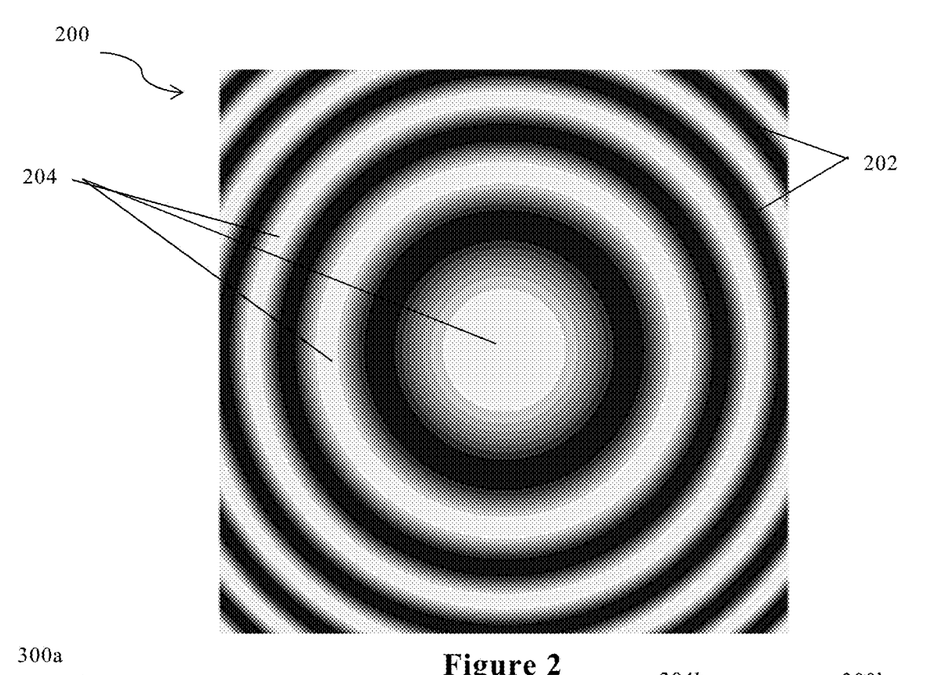
FIG. 2 shows an example of a signal suitable for use with the invention.

In the embodiments being described with respect to FIG. 2, the signal 200 takes the form of a continuous function, with no jumps. In alternative embodiments, the amplitude of the signal 200, 900 may jump between two or more discrete values. In the embodiments being described with respect to FIG. 9, the signal 900 takes the form of an at least quasi-random variation across an area.

In the embodiments being described, the amplitude is used to determine an intensity of the overlay 500a-c. In additional or alternative embodiments, the amplitude may be converted into a colour, transparency, and/or lightness/darkness of the overlay 500a-c.

In the embodiments being described with respect to FIG. 2, the signal 200 takes the form of the Bessel function $J_0(r)$, plotted in radial coordinates. In these embodiments, the origin of the radial coordinates is arranged to be in the centre of a frame 302 such that the signal 200 is symmetrical within the frame 302; in alternative embodiments, the signal 200 may not be symmetrical (see FIG. 9A, for example), and/or may not be positioned so that the pattern of the signal 200 is symmetrical across the frame 302.

The skilled person will appreciate that, in embodiments using a signal 200, 900, any form of signal 200, 900 could be used, provided that the signal 200, 900 is not constant across the overlay region 310a,b. For example, the signal 200, 900 may take the form of a discrete function or a continuous function, polynomial and/or trigonometric function, a random or pseudo-random noise-like signal (i.e. randomly, or apparently randomly, varying), or any combination of the above.

In the embodiment being described, the magnitude of the amplitude of the signal 200, 900 is capped (i.e. the amplitude has a maximum positive value and/or a minimum negative value, shown as white and black in the Figures, with greys illustrating intermediate amplitudes). Capping the amplitude allows the variation in the property of the overlay 500a-c to be limited, so reducing visibility of the overlay in use.

In the embodiment being described, the choice of signal 200, 900 is independent of user ID.

Secondly, an overlay pattern 400a-d is generated 806 based on the user ID.

The overlay pattern 400a-d encodes the user ID, and can be de-coded to obtain the user ID. The decoding can be performed more easily if a process used to encode the user ID is known.

Figure 4A:
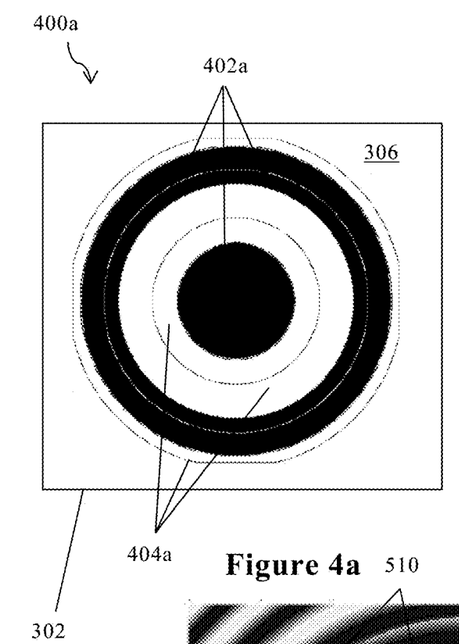
FIGS. 4a and 4b show overlay patterns generated using a user ID and the overlay region segmentations shown in FIG. 3a and FIG. 3b, respectively.
Figure 4B:
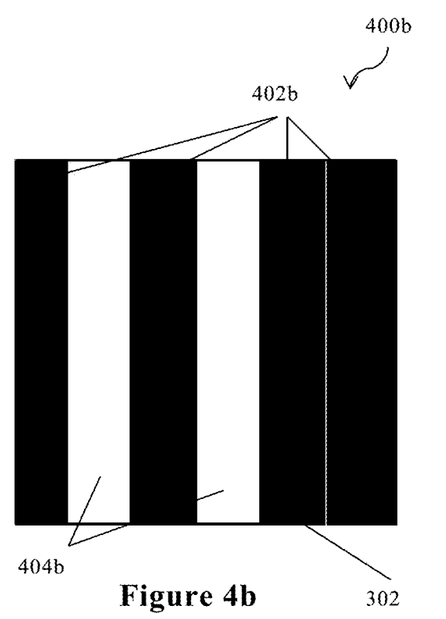

The user ID is an alphanumeric code encoded in binary in the overlay patterns 400a-b shown in FIGS. 4a and 4b.

In the embodiment being described, the overlay pattern 400a-d is made up of a segmentation 300a-d of the overlay region 310a,b of a frame 302 into a plurality of segments 304a-d. Each segment of the segmentation corresponds to some or all of a zone in the image 500a-c when the image is generated.

Figure 3A:
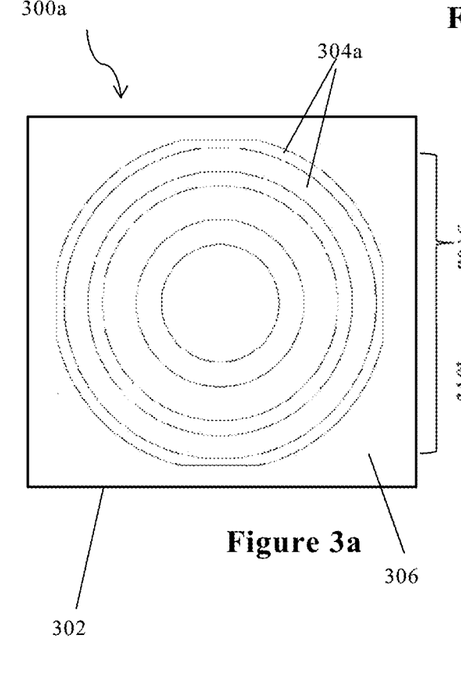
FIGS. 3a and 3b show two schematic overlay region segmentations.

In the embodiment shown in FIG. 3a, the segmentation 300a consists of a central circle surrounded by a series of rings of various widths. The circle and each ring is a segment 304a.

Figure 3B:
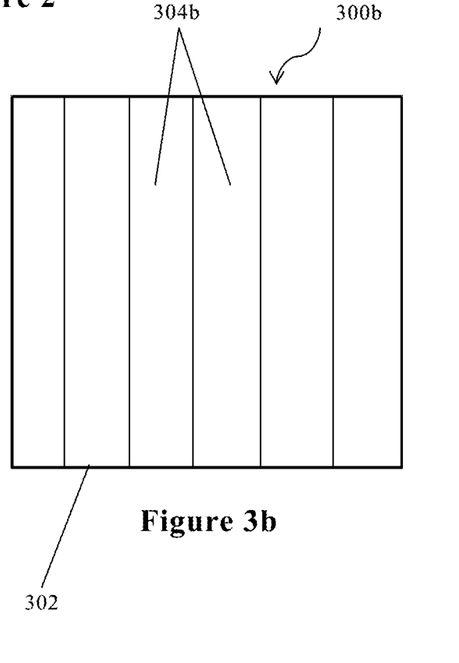

In the embodiment shown in FIG. 3b, the segmentation 300b consists of a series of vertical stripes of equal widths, across the whole height of the frame 302. Each stripe is a segment 304b.

In some embodiments, such as that shown in FIG. 3a, the overlay region 310a is smaller than the frame 302, such that there is a region 306 of the frame which is not included in the overlay region.

In some embodiments, such as that shown in FIG. 3b, the overlay region 310b covers the entire frame 302, such that there is no region of the frame which is not included in the overlay region.

Figure 6A:
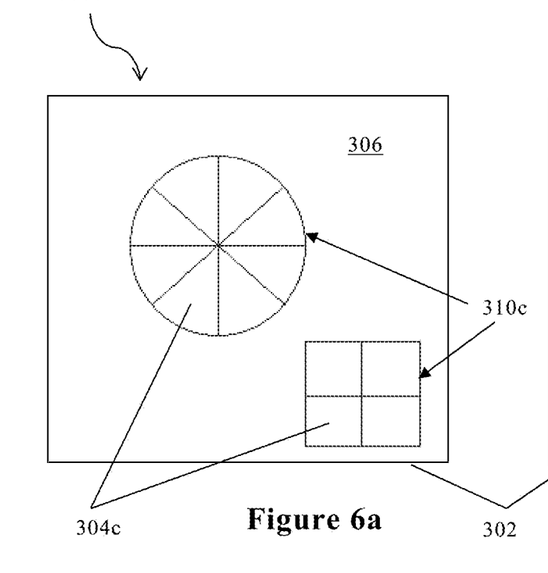
FIGS. 6a and 6b show two further schematic overlay region segmentations.

In some embodiments, such as that shown in FIG. 6a, the overlay region 310c comprises two separate overlay sub-regions, with a region 306 of the frame 302 which is not included in the overlay region 310c between the two overlay sub-regions.

In some embodiments, such as those shown in FIGS. 3a, 3b and 6a, the segmentation 300a-c is made up of regular shapes. In other embodiments, such as that shown in FIG. 6b, the segmentation 300d is made up of irregular shapes.

Similarly, the individual segments 304a-d of a segmentation may all be the same size and shape (300b), all be of different sizes and/or shapes (300a, 300d), or be a mixture of sizes and/or shapes (300c).

In addition, the structure of the segmentation 300a-d may be correlated to the shape of the signal 200, as for the segmentation 300a shown in FIG. 3a (in which the signal 200 generates a radial pattern which matches the ring like nature of the segmentation), or may have no relation to the shape of the signal 200, 900, as for the other example segmentations 300b-d shown, and the signal 900 shown in FIG. 9A.

The skilled person will appreciate that the segmentation 300a-d may take any form provided that enough individual segments 304a-d are provided to allow the user ID to be encoded as described below and for example, each individual segment may provide a bit, or other character (for example if a non-binary code is used), of the user ID. In this regard, the skilled person would appreciate that the examples of segmentations 300a-d shown are illustrative only, and that for real-world user IDs, a larger number of segments 304a-d would generally be used.

Further, in the embodiment being described, more segments 304a-d are provided than are needed to encode the user ID so that the additional segments 304a-d can be used for error checking. These additional segments can be described as check bits.

In some embodiments, check bits may provide an error correcting code. In such embodiments, the unique identifier 500a-c comprises more bits than are needed to encode the user ID, and the additional bits are used as check bits. For example, the check bits may allow any one of the following codes: a Hamming Code; a Reed-Solomon code; a Low Density Parity Check; or the like. The skilled person will appreciate use of such codes will increase the robustness, for embodiments that use the code, with which the user ID can be extracted from a media content 106a-c.

In addition to the segmentation 300a-d and in the embodiment being described, the overlay pattern 400a-d comprises an operation associated with each segment 304a-d. Each zone of the image 500a-c once generated corresponds to the one or more segments 304a-d with a particular operation (or without an operation, which can be thought of as being with a null operation). Thus, each zone may be thought of as having the same operation applied to all segments within it.

Other embodiments may not rely on a signal and/or operation to generate the zones and for example could use a pattern, image, or the like to separately identify the zones.

In the embodiments shown in FIGS. 4a and 4b, two different operations are used, as marked by different shadings of the segments (segments 402a and 402b being shown in a first colour and segments 404a and 404b being shown in a second colour). Each segment 402a, 402b can therefore be thought of as a bit taking a value of either 1 or 0, thereby encoding the user ID in binary. The skilled person will appreciate that the segments need not encode binary and that there may be more than two zones.

In these embodiments, the generated image 500a-c therefore has two different zones, one corresponding to each of the two operations. Each zone is made up of one or more segments. The one or more segments define the position (and shape, which may be considered to be a feature of position in this context) of each zone. The position of each zone is therefore a result of which segments are associated with which operation. The position and/or shape of each zone therefore encodes the user ID.

In the embodiments shown in FIGS. 4a and 4b, the operations are a multiplication by +1 and by −1, respectively. It will be appreciated that a multiplication by +1 has no effect, and may therefore be described as a null operation. Multiplication by −1 may be thought of as an inversion of the signal 200, 900.

In these embodiments, the darker segments 402a,b correspond to multiplication by −1 and the lighter segments correspond to multiplication by +1. In the embodiments shown in FIG. 4a and FIG. 7a, there is a region 306, 406c outside of the overlay region 310 in which no operation is performed on any overlaid signal 200, 900.

Figure 7A:
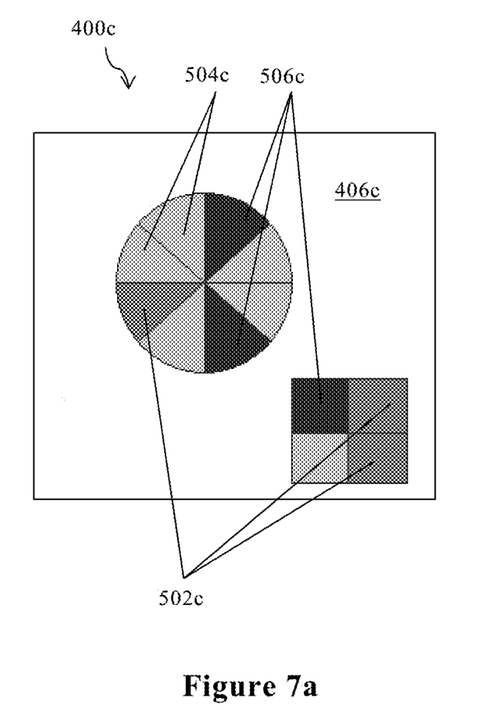
FIGS. 7a and 7b show overlay patterns generated using a user ID and the overlay region segmentations shown in FIG. 6a and FIG. 6b, respectively.
Figure 7B:
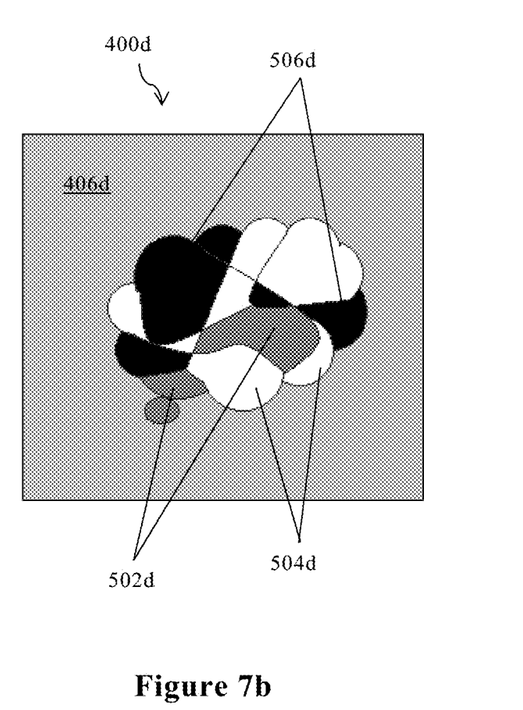

In the embodiments shown in FIGS. 7a and 7b, three different operations are used, as marked by different shadings of the segments (segments 502c being a first colour, segments 504c being a second colour and segments 506c being a third colour). As a result, three different zones would be formed in the image 500a-c generated. As such, this embodiment encodes in base three rather than binary.

In the embodiment shown in FIG. 7b, the region 406d outside of the overlay region is shaded, indicating that an operation is applied to any overlaid signal 200, 900 in that region. In the embodiment being described, this operation is a removal of any signal 200, 900 outside of the overlay region, for example by multiplication by zero.

In alternative or additional embodiments, the signal 200, 900 may be present in the region 306 outside of the overlay region 310 but not processed, or may not be present in the region 306 outside of the overlay region 310. Alternatively or additionally, a different signal may be applied outside of the overlay region 310.

In alternative or additional embodiments, different operations may be used, for example addition or subtraction of an amount or a function instead of, or as well as, multiplication by a scaling factor, and/or multiplication by a function or another transformation or operation. The skilled person will appreciate that any operations which create a detectable difference between a segment as processed by one operation and that segment as processed by another of the operations may be used.

In the embodiments being described, the same segmentation 300a-d is used to encode multiple different user IDs by differences in the assignment of operations to segments 302, 402, 502. The same segmentation can therefore form different zone positions in the generated image 500a-c.

In alternative or additional embodiments, a different segmentation may be used for each user, for example taking the form of a photograph, a QR code ("Quick Response" Code), or similar, or a unique image. A QR code comprises a two-dimensional bar code having both 'black' pixels and 'white' pixels.

In various embodiments, the segmentation can be thought of in two separate ways.

Firstly, the segmentation may be treated as having only two separate segments, for example corresponding to the black pixels and white pixels usually seen in QR codes. Each segment corresponds directly to a single zone. Each segment corresponds to a single zone in such embodiments. From this perspective, the shape of the segmentation itself may therefore fully encode the user ID, instead of requiring assignments of operations based on a user ID. The same operation may be applied to the region of the segmentation corresponding to the black pixels, with no operation (or a different operation) being applied to the region of the segmentation corresponding to the white pixels (i.e. all parts of the overlay region not corresponding to black pixels). The skilled person will appreciate that this is equivalent in principle to seeing the black region of a QR code as a selection of blocks, e.g. pixels, each block being a segment, but slightly different in the algorithm used. A different segmentation would be used for each user under this approach. Under this approach, a unique image (e.g., a picture of a user's pet or face) could be used as the segmentation.

Secondly, each segment may correspond to one of the pixels of the QR code. Therefore, the same operation may be applied to the segments corresponding to first zone with no operation (or a different operation) being applied to the second zone (i.e. all parts of the overlay region not corresponding to black pixels). Multiple pixels (i.e. multiple segments) form each zone under this approach. The same segmentation (i.e. grid of pixels) could be used for multiple users, with a different zone pattern to encode different user IDs.

The skilled person will appreciate that the "first" and "second" steps 804, 806 performed at the target device 114 as described above are listed in this order for ease of description only, and could be performed in the opposite order.

The signal 200, 900 is processed 808 based on the overlay pattern 400a-d, so as to form an overlay 500a-c encoding the user ID.

Figure 5A:
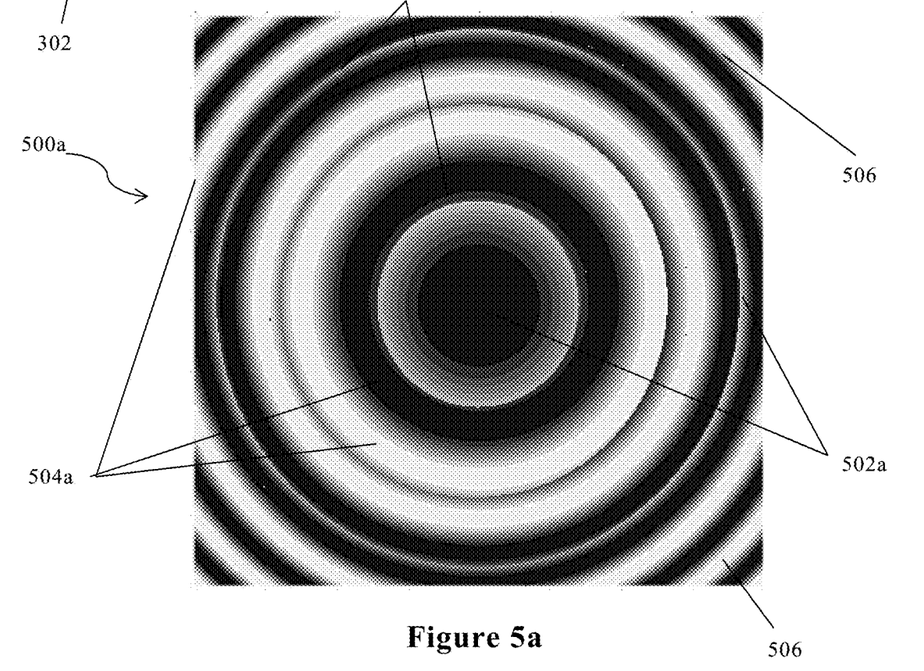
FIGS. 5a and 5b show the image generated by processing the signal shown in FIG. 2 using the overlay pattern of FIG. 4a and of FIG. 4b, respectively.
Figure 5B:
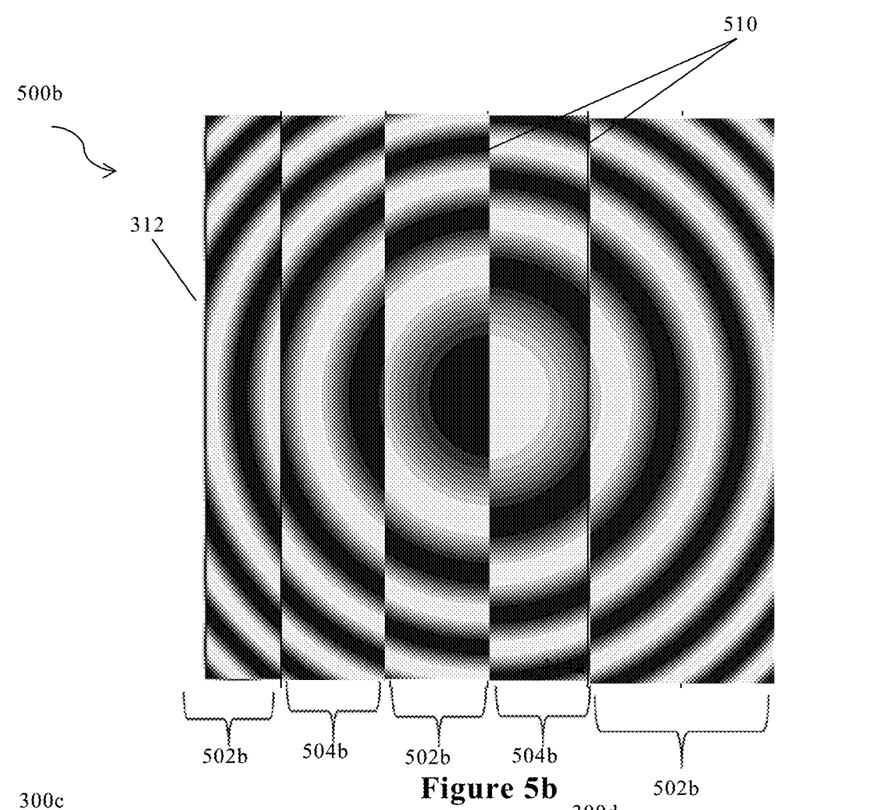

FIGS. 5a and 5b show the overlays 500a, 500b generated using the signal 200 shown in FIG. 2 with the overlay patterns 400a, 400b shown in FIGS. 4a and 4b, respectively.

In particular, using the overlay pattern 400a shown in FIG. 4a, signal 200 in the areas of the frame 302 corresponding to centre-most circular segment and the third and fourth ring-shaped segments out from the centre 402a of the overlay region are inverted (by multiplication by minus one) and the signal 200 in the remaining area 404a, 306 of the frame 302 is left unchanged (equivalent to multiplication by +1), so as to generate the overlay 500a.

Similarly, using the overlay pattern 400b shown in FIG. 4b, the signal 200 in the areas of the frame 302 corresponding to the first, third, fifth and sixth stripes 402b, as counted from the left hand side of the frame 302, of the overlay region are inverted (by multiplication by minus one) and the signal 200 in the remaining area 404b of the frame 302 is left unchanged, so as to generate the overlay 500b.

FIG. 9b show the overlay 500c generated using the signal 900 shown in FIG. 9a with the overlay patterns 400b shown in FIG. 4b.

Using the overlay pattern 400b shown in FIG. 4b, the signal 900 in the areas of the frame 302 corresponding to the first, third, fifth and sixth stripes 402b, as counted from the left hand side of the frame 302, of the overlay region are inverted (by multiplication by minus one) and the signal 200 in the remaining area 404b of the frame 302 is left unchanged, so as to generate the overlay 500c. The resultant image 500a,b,c therefore has two zones, one of which corresponds to segments in which the signal 200, 900 is inverted with respect to the original signal, and the other of which corresponds to segments in which the signal 200, 900 is not inverted. The positions of the operations in the overlay pattern 400b controls the position of the zones, thereby encoding the user ID in the image 500a,b,c.

Once the overlay 500a,b,c has been generated, it is then superposed 810 onto frames 302 of the video media content 104 so as to generate the marked video media content 106a-c.

As discussed above, not all frames 302 are marked in some embodiments. The skilled person would appreciate that conveniently a sufficiently large proportion of the frames 302 is marked to allow the user ID to be extracted without requiring identification of where in the media content 106a-c to look for the unique identifier 500a,b,c. In the embodiments being described, between <1% and 100% of the frames 302 are marked. In some embodiments, at least 30% or 50% of frames are marked, with all frames being marked in some embodiments 106c.

In the embodiments being described, the same overlay 500a,b,c is used on all marked frames 302 the video media content 106a-c. The skilled person will appreciate that the overlay 500a,b,c creates a pattern of intensity shifts across the overlay region which is consistent across marked frames 302, and so can be detected by a method involving averaging frames 302 such that the varying intensities provided by the unmarked video media content 104 are at least substantially averaged out.

In the embodiments being described, once the overlay 500a,b,c has been generated, it is saved at the target device 114a-c as an image file or the like. In this way, the overlay 500a,b,c is only generated once, and can then be used as many times as wished without further processing being needed to re-generate the file.

In the embodiments being described, the same signal 200, 900 and the same segmentation 300a-d of the overlay region are used for all video media content 104 sent to multiple target devices 114a-c each associated with a different user ID. The different user ID provides differentiation between the processed signals 106a-c as it is used to control assignment of operations to segments.

In alternative or additional embodiments, a different signal 200, 900 and/or a different segmentation 300a-d may be used dependent on the video media content 104 and/or upon the user ID.

In alternative or additional embodiments, a different signal 200, 900 and/or a different segmentation 300a-d may be used dependent on the time and/or date on which the video media content 104 was sent to the target device 114a-c.

In the embodiment being described with respect to FIG. 5b, the boundaries 510 between segments 502b, 504b for which different operations have been performed are quite visible. A malicious user wishing to disguise the unique identifier 500b may therefore be able to identify at least some of the segments 502b, 504b relatively easily, which could be a first step towards removing or disguising the unique marker 500b.

In some embodiments, steps are therefore taken to disguise the boundaries 510.

In the embodiment shown in FIG. 5a, the boundaries 510 are less visible because the segmentation 400a has been chosen to match the signal 200, in that the pattern of each is based on concentric rings. It is therefore less easy to distinguish colour changes due to the signal 200 from colour changes due to the overlay 500a.

Figure 6B:
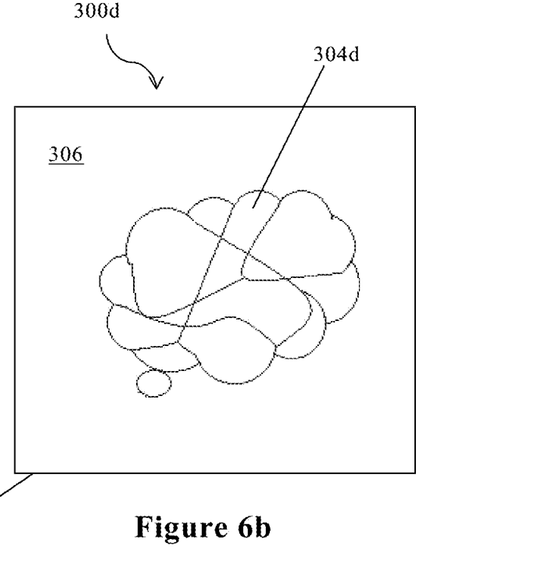

In the embodiment shown in FIGS. 6b and 7b, the borders and shapes of the segments 304d are irregular, again making the boundaries 510 less easy to see in use.

In the embodiment shown in FIG. 9b, the scale of the variation in intensity is small compared to the frame and to each zone, and the variation is substantially random. This variation, which may be thought of as texture to the image 500c, again makes the boundaries less apparent, so making the image 500c less visible. The image 500c resembles noise.

In alternative or additional embodiments, one or more of the following steps may be taken to disguise the boundaries 510 between segments:
i. the signal 200, 900 may have one or more sharp discontinuities such that it is less easy to distinguish between discontinuities due to the signal and due to segment boundaries 510 if you do not know the segmentation pattern;
ii. an additional overlay may be applied with random or pseudo-random intensity variations aligning with the boundaries 510;
iii. the signal 200, 900 may be smoothed after processing to avoid sharp changes at the boundaries 510; and
iv. for embodiments using scaling factors in the segments, the combination of signal 200, 900 and segmentation 300a-d may be chosen such that the signal 200, 900 always has an amplitude at or near zero in the region of the boundaries 510, to avoid sharp changes at the boundaries.

In some embodiments, a monitoring system 1100 is arranged to monitor and/or identify data existing on data sources 1106 accessible by the system. In the embodiment being described the data 1106 are video media content, such as videos and may be Internet streams. In the embodiment being described, these are found via links on the World Wide Web (WWW) and thus, the data-sources are provided by web-sites, user-forums, chat-rooms or the like that are accessible over the WWW. In other embodiments the data 1106 being monitored may be other than media streams and may be in particular non-streamed media such as video files (such as MP4; WMV; or the like). Thus, the monitoring system 1100 is arranged to receive candidate video media 906 which can be processed to look for unique identifiers 500a,b,c as described herein.

In alternative, or additional, embodiments, the monitoring system 1100 may be arranged to monitor sources of data 1106 over a network other than the WWW. For example, the network may be the Internet (and not the WWW), or the like.

The monitoring system 1100 is typically provided by a plurality of processing circuits 1102, which may be physical machine, virtual machines or a mixture of both.

The monitoring system 1100 is arranged to average some or all frames 302 of the candidate media content 1106, which may, for example, be a film identified by a file name or a programme in a stream identified by video metadata. Averaging the frames 302 may allow an overlay 500a-b to be detected, if present. A filter may also be used, depending on known parameters of the overlay 500a,b.

The monitoring system 1100 comprises, or in alternative or additional embodiments has access to, a memory 1104. The memory 1104 stores information relating to the one or more segmentations 300a-d and the one or more signals 200, 900 used for the marking as described herein.

The monitoring system 1100 identifies the segmentation 300a-d and the signal 200 used, for example using metadata associated with the candidate media content 1106, or the fingerprints produced by the fingerprinting process referenced above. Where an overlay 500a-c is present in the candidate media content 1106, the overlay pattern 400a-d can then be extracted.

The monitoring system 1100 may then either decode the overlay pattern 400a-d to reveal a user ID, or send the overlay pattern 400a-d to a separate device or system for decoding.

The user ID revealed may then be linked back to the user from whom the copy of the media content 104 originated.

As described above, a user ID is encoded into the video media content 104 via an overlay 500a,b,c to provide a, typically, unique identification of a user to whom the content 104 was delivered. The skilled person will appreciate that the segmentation 300a-d of the overlay region, the signal 200, 900 and the manner in which the user ID is encoded, may be varied between embodiments.

Is some embodiments, the image overlaid onto the media content may be generated remote from the target device and download to the target device. This embodiment, and indeed other embodiments, may store the image to be overlaid once it has been generated so that it does not to be repeatedly generated, or at least generated less often thereby reducing the processor time needed to mark the media-content.

What is claimed is:
1. A method of marking video media-content, which comprises a plurality of frames, with a user ID, the method comprising:
arranging a media-delivery platform to have a plurality of target devices connected thereto and further arranging the media-delivery platform to deliver the video media-content to a specified target device of the target devices, at which the user ID is being used; and
overlaying an image over at least some frames of the plurality of frames as the video media-content is displayed at the specified target device,
wherein the image encodes the User ID and comprises a plurality of zones, the zones being arranged to encode the User ID and wherein a visual property of the image is arranged to vary within at least some of the zones, wherein the image is arranged such that when the image is overlaid on the video media content, the image is at least substantially imperceptible to a user,
wherein the image is formed by combining a signal with an overlay pattern, wherein the signal provides the variation of the visual property and the overlay pattern defines the zones, and
wherein the signal is arranged to cover at least an overlay region of a frame, which is smaller than the area of the frame.

2. The method of claim 1, further comprising obtaining the user ID from the marked video media-content by averaging frames together.

3. The method of claim 1, wherein the position and/or shape of each zone within the image encodes the User ID within the image.

4. The method of claim 1, wherein the variation of the visual property comprises a texture across the at least some of the zones.

5. The method of claim 1, wherein a lengthscale of the variation of the visual property is small compared to the size of each zone.

6. The method of claim 1, wherein the variation is a noise function.

7. The method of claim 1, wherein the overlay pattern comprises a segmentation of the overlay region into the plurality of segments and an operation associated with each segment and wherein the image is formed by processing the signal according to the overlay pattern, the processing comprising applying the operation associated with each segment to the portion of the signal falling within that segment so as to form the plurality of zones.

8. The method of claim 7, wherein the signal is overlaid over the entirety of each frame of the at least some frames, but only processed according to the overlay pattern in the overlay region.

9. The method of claim 7, wherein the operation comprises multiplication and each segment has a scaling factor associated therewith.

10. The method of claim 9, wherein two different scaling factors are used, and wherein the scaling factors are −1 and 1.

11. The method of claim 7, wherein the same signal and the same segmentation are used for multiple target devices each associated with a different user ID, with the different user ID providing differentiation as to which operation is associated with which segment in the overlay pattern, so changing the positions of the zones in the image.

12. The method of claim 1, wherein the transparency of the image is selected to render the image substantially imperceptible on each frame to which it is applied, and wherein the transparency is at least 0.95.

13. The method of claim 1, wherein the image is generated and then stored at the target device such that the same image can be overlaid over multiple frames without needing to be re-generated.

14. The method of claim 1, wherein the image is rendered in a semi-transparent layer on the target device, the semi-transparent layer being arranged to be aligned with the frames of the video media content.

15. A method of securing and/or tracing video media-content which comprises a plurality of frames, the method comprising:
arranging a media-delivery platform to have a plurality of target devices connected thereto and further arranging the media-delivery platform to deliver the video media-content to a specified target device of the target devices, at which the user ID is being used;
overlaying an image over at least some frames of the plurality of frames as the video media-content is displayed at the target device;
monitoring candidate video media-content; and
extracting the overlay pattern from frames within the or each candidate video media-content to identify the user ID being used at the target device to which the video media-content was delivered,
wherein the image encodes the User ID and comprises a plurality of zones, the zones being arranged to encode the User ID and wherein a visual property of the image is arranged to vary within at least some of the zones, wherein the image is arranged such that when the image is overlaid on the video media content, the image is at least substantially imperceptible to a user,
wherein the image is formed by combining a signal with an overlay pattern, wherein the signal provides the variation of the visual property and the overlay pattern defines the zones, and
wherein the signal is arranged to cover at least an overlay region of a frame, which is smaller than the area of the frame.

16. A method of marking video media-content which comprises a plurality of frames with a user ID, the method comprising, at a target device associated with the user ID:
receiving the video media-content; and
overlaying an image over at least some frames of the plurality of frames as the video media-content is displayed at the specified target device,
wherein the image encodes the User ID and comprises a plurality of zones, the zones being arranged to encode the User ID and wherein a visual property of the image is arranged to vary within at least some of the zones, wherein the image is arranged such that when the image is overlaid on the video media content, the image is at least substantially imperceptible to a user,
wherein the image is formed by combining a signal with an overlay pattern, wherein the signal provides the variation of the visual property and the overlay pattern defines the zones, and
wherein the signal is arranged to cover at least an overlay region of a frame, which is smaller than the area of the frame.

17. A machine readable medium containing instructions which, when read by a machine, cause a processor of that machine to perform the following steps:
receive, at a target device associated with a user ID, video media-content which comprises a plurality of frames; and
overlay, at the target device associated with the user ID, an image over at least some frames of the plurality of frames as the video media-content is displayed at the specified target device,
wherein the image encodes the User ID and comprises a plurality of zones, the zones being arranged to encode the User ID and wherein a visual property of the image is arranged to vary within at least some of the zones, wherein the image is arranged such that when the image is overlaid on the video media content, the image is at least substantially imperceptible to a user,
wherein the image is formed by combining a signal with an overlay pattern, wherein the signal provides the variation of the visual property and the overlay pattern defines the zones, and
wherein the signal is arranged to cover at least an overlay region of a frame, which is smaller than the area of the frame.

18. A target device associated with a user ID and arranged to mark video media-content which comprises a plurality of frames such that the user ID is encoded in the marked video-media content, the target device being arranged to:
receive the video media-content; and
overlay an image over at least some frames of the plurality of frames as the video media-content is displayed at the specified target device,
wherein the image encodes the User ID and comprises a plurality of zones, the zones being arranged to encode the User ID and wherein a visual property of the image is arranged to vary within at least some of the zones, wherein the image is arranged such that when the image is overlaid on the video media content, the image is at least substantially imperceptible to a user, wherein the image is formed by combining a signal with an overlay pattern, wherein the signal provides the variation of the visual property and the overlay pattern defines the zones, and wherein the signal is arranged to cover at least an overlay region of a frame, which is smaller than the area of the frame.

\* \* \* \* \*